(12) United States Patent
Khurana et al.

(10) Patent No.: US 12,282,479 B2
(45) Date of Patent: Apr. 22, 2025

(54) INTELLIGENT PARITY SERVICE WITH DATABASE QUERY OPTIMIZATION

(71) Applicant: Intuit Inc., Mountain View, CA (US)

(72) Inventors: Sandeep Khurana, Bangalore (IN); Ketan Gunvantrai Popat, Bangalore (IN)

(73) Assignee: Intuit Inc., Mountain View, CA (US)

( * ) Notice: Subject to any disclaimer, the term of this patent is extended or adjusted under 35 U.S.C. 154(b) by 264 days.

(21) Appl. No.: 17/589,869

(22) Filed: Jan. 31, 2022

(65) Prior Publication Data

US 2023/0244661 A1 Aug. 3, 2023

(51) Int. Cl.
G06F 16/2453 (2019.01)
G06F 16/14 (2019.01)
G06F 16/2455 (2019.01)

(52) U.S. Cl.
CPC ...... *G06F 16/24537* (2019.01); *G06F 16/152* (2019.01); *G06F 16/24554* (2019.01)

(58) Field of Classification Search
CPC .......................... G06F 16/24554; G06F 16/152
See application file for complete search history.

(56) References Cited

U.S. PATENT DOCUMENTS

| | | | | |
|---|---|---|---|---|
| 10,771,257 B1* | 9/2020 | de Matos | ............... | H04L 9/0643 |
| 10,846,307 B1* | 11/2020 | Dudami | ............ | G06F 16/24573 |
| 10,963,435 B1* | 3/2021 | McAlister | ........... | G06F 11/0766 |
| 11,100,111 B1* | 8/2021 | Akidau | ................. | G06F 16/258 |
| 11,531,666 B1* | 12/2022 | Park | ..................... | G06F 16/2272 |
| 11,593,477 B1* | 2/2023 | Thimmegowda | ..... | G06F 21/552 |
| 2008/0189498 A1* | 8/2008 | Brown | ................ | G06F 11/2097 711/162 |
| 2011/0231666 A1* | 9/2011 | Guenther | ................ | G06F 21/32 713/186 |
| 2012/0117040 A1* | 5/2012 | Hostetter | ............ | G06F 11/1076 707/697 |
| 2013/0247153 A1* | 9/2013 | Sharma | .............. | G07C 9/00174 726/4 |
| 2020/0334231 A1* | 10/2020 | Muralidhar | ............. | G06F 3/067 |
| 2021/0133029 A1* | 5/2021 | Dong | .................... | G06F 3/0619 |
| 2021/0191955 A1* | 6/2021 | Sardina | ................ | G06F 16/273 |
| 2021/0303548 A1* | 9/2021 | Raghavan | ................ | G06N 5/04 |
| 2022/0075532 A1* | 3/2022 | Schaefer | ............. | G06F 11/1048 |
| 2023/0140404 A1* | 5/2023 | Tsyganko | ............ | G06F 16/1734 707/687 |

* cited by examiner

*Primary Examiner* — Vaishali Shah
(74) *Attorney, Agent, or Firm* — Lathrop GPM LLP

(57) ABSTRACT

A method for performing a parity check of a table by a software application may include obtaining, from a data lake, data lake records stored in the table during a time interval, obtaining partitioning information used to partition the table in a database during the time interval, extracting, from the data lake records and for the partitioning information, partition identifiers stored in the table during the time interval, generating a partition-specific database query including a partition identifier, executing the partition-specific database query to obtain database records stored in the table in a partition of the database during the time interval, extracting a subset of the data lake records that include the partition identifier, and performing a parity comparison on the subset of the data lake records and the database records to generate a parity result.

15 Claims, 6 Drawing Sheets

INTELLIGENT PARITY SERVICE WITH DATABASE QUERY OPTIMIZATION

BACKGROUND

After ingesting records in a table of a source database into a table in a data lake, a parity check may be performed to validate that the ingestion was performed correctly. That is, the parity check may validate that corresponding records in the database and the data lake have the same parity (e.g., checksum value). However, the source database might not be able to handle queries from a parity service, which may involve a large volume of records. For example, the results for such a database query may return millions of records, requiring costly allocation of additional hardware or software resources, and potentially resulting in degraded database performance.

SUMMARY

This summary is provided to introduce a selection of concepts that are further described below in the detailed description. This summary is not intended to ident key or essential features of the claimed subject matter, nor is it intended to be used as an aid in limiting the scope of the claimed subject matter.

In general, in one aspect, one or more embodiments relate to a method for performing a parity check on a table by a software application, including obtaining, from a data lake, data lake records stored in the table during a time interval, obtaining partitioning information used to partition the table in a database during the time interval, extracting, from the data lake records and for the partitioning information, partition identifiers stored in the table during the time interval, generating a partition-specific database query including a partition identifier, executing the partition-specific database query to obtain database records stored in the table in a partition of the database during the time interval, extracting a subset of the data lake records that include the partition identifier, and performing a parity comparison on the subset of the data lake records and the database records to generate a parity result.

In general, in one aspect, one or more embodiments relate to a system for performing a parity check on a table by a software application, including a data lake configured to store data lake records in the table during a time interval, a database configured to store the table in partitions corresponding to partition identifiers based on partitioning information for the time interval, and a parity service configured for: obtaining, from the data lake, the data lake records, obtaining the partitioning information, extracting, from the data lake records and for the partitioning information, the partition identifiers, generating a partition-specific database query including a partition identifier, executing the partition-specific database query to obtain database records stored in the table in a partition of the database during the time interval, extracting a subset of the data lake records that include the partition identifier, and performing a parity comparison on the subset of the data lake records and the database records to generate a parity result.

In general, in one aspect, one or more embodiments relate to a method for performing a parity check on a table by a software application, including sending a table identifier to a parity service configured to perform: obtaining, from a data lake, data lake records stored in the table during a time interval, obtaining partitioning information used to partition the table in a database during the time interval, extracting, from the data lake records and for the partitioning information, partition identifiers stored in the table during the time interval, generating a partition-specific database query including a partition identifier, executing the partition-specific database query to obtain database records stored in the table in a partition of the database during the time interval, extracting a subset of the data lake records that include the partition identifier, performing a parity comparison on the subset of the data lake records and the database records to generate a parity result, and transmitting the parity result. The method further includes receiving, from the parity service, the parity result.

Other aspects of the invention will be apparent from the following description and the appended claims.

DETAILED DESCRIPTION

Figure 1:
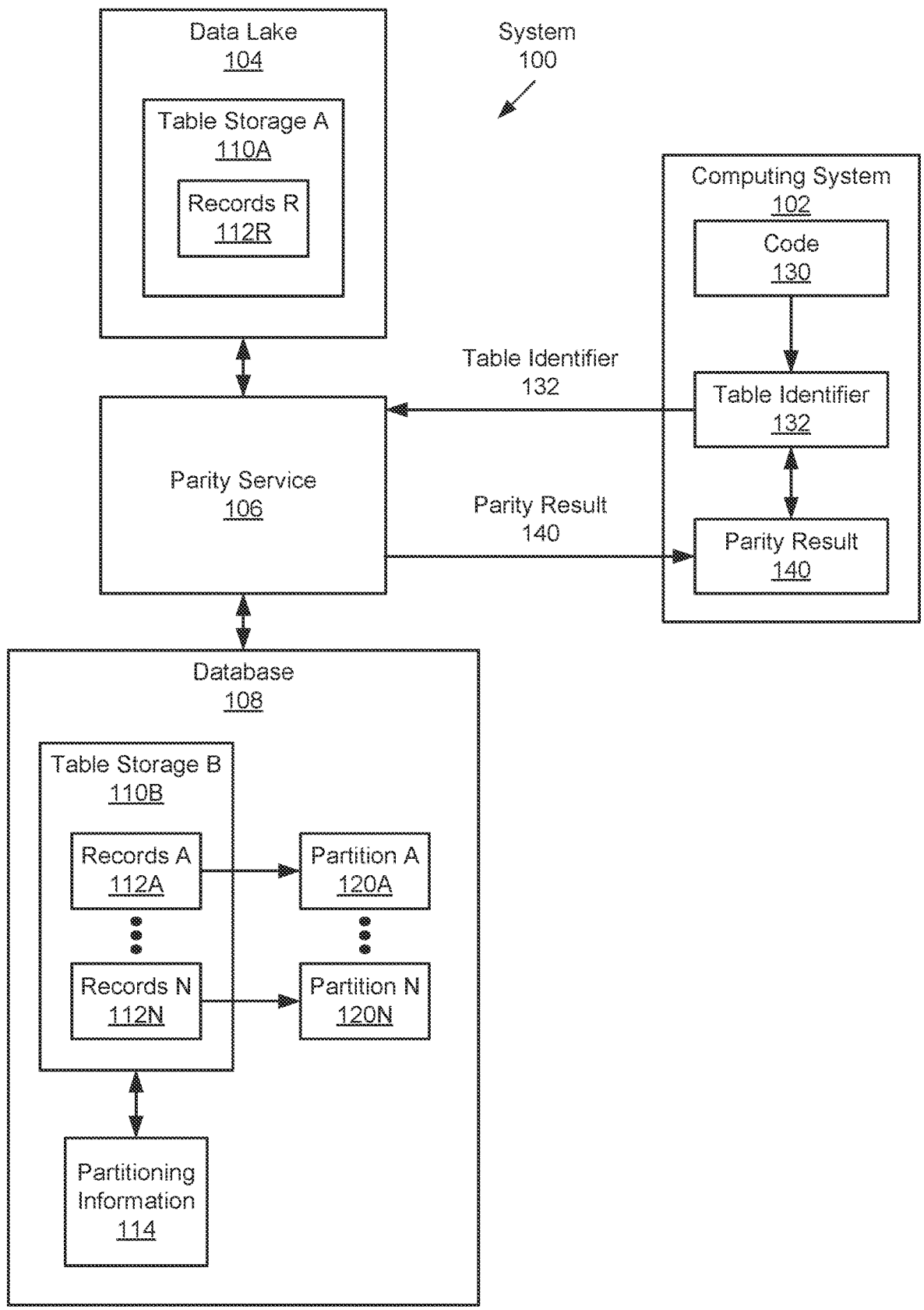
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to ingesting (followed by performing a parity check on) a table by a software application. The table may be ingested to a data lake from a database. A parity comparison is performed on records obtained from the table in the data lake and corresponding records obtained from the table in the database. The records stored in the database may be distributed over multiple partitions based on partitioning information for the table. The partitioning information may include the values of one or more partition fields. For example, a partition field may be "geographic region," where different partitions may correspond to different geographic regions. A parity service may perform a parity comparison on pairs of records stored during a time interval, where one record is stored in the data lake and the other record is stored in the database. The parity comparison determines whether the pair of records have matching parity (e.g., whether each record includes an identical checksum).

In order to provide a general solution for tables ingested by software applications which may be partitioned based on different partitioning information, the parity service may dynamically (e.g., at runtime) extract partitioning information for the table from the database. For example, the parity service may extract a partition field from the database. The parity service may extract distinct values for the partition field, referred to as partition identifiers, from the records obtained from the data lake. The parity service may then obtain records of the table from each database partition separately, without knowing in advance how the table is partitioned. For example, partition-specific queries each including a different partition identifier may be executed to obtain partition-specific query results that include records stored in a specific partition. Thus, the database may scan a single partition when executing each partition-specific query. By generating separate partition-specific queries whose results are restricted to a single partition, the parity service may reduce the processing burden on the database, for example, by reducing hardware and/or software resource requirements and/or reducing database failures due to exhausting memory resources.

FIG. 1 shows a system (100) in accordance with one or more embodiments of the invention. As shown in FIG. 1, the system (100) includes a computing system (102), a data lake (104), a parity service (106), and a database (108). In one or more embodiments, the computing system (102) and the parity service (106) take the form of the computing system (500) described with respect to FIG. 5A and the accompanying description below or take the form of the client device (526) described with respect to FIG. 5B.

In one or more embodiments, the data lake (104) may be a large-scale data storage system that includes structured and/or unstructured data. For example, the data lake (104) may store tables, objects, files, etc. The data lake (104) may include multiple different storage units and/or devices. The multiple different storage units and/or devices may or may not be of the same type or located at the same physical site. The data lake (104) may be accessed online via a cloud service (e.g., Amazon Web Services (AWS), Egnyte, Azure, etc.). As an option, the data lake (104) may operate on a clustered computing environment, such as a Hadoop cluster. QuickBooks Online® or Mint®).

In one or more embodiments, the data lake (104) includes table storage (110A). The table storage (110A) includes functionality to store a table. The table may be used by a software application. For example, the software application may be QuickBooks Online®, Mint®, TurboTax Online®, etc. The table is a structure that includes records (112R). The table may correspond to a table identifier (e.g., table identifier (132)). For example, the table identifier may be a unique identifier of the table. Each record may be a row in the table that includes values corresponding to fields (e.g., columns). Values of the fields may be represented in a structured format. For example, the structured format may be a format compatible with the Structured Query Language (SQL).

In one or more embodiments, the database (108) may be a large-scale data storage system. The database (108) may include multiple different storage units and/or devices. The multiple different storage units and/or devices may or may not be of the same type or located at the same physical site. The database (108) may be accessed online via a cloud service.

In one or more embodiments, the database (108) includes table storage (110B). The database (108) may be divided into multiple partitions (120A, 120N). For example, records (112A, 112N) in table storage (110B) may be distributed over the partitions (120A, 120N). Distributing the records (112A, 112N) of a table over multiple partitions may improve the performance and scalability of processing and/or accessing the information in table storage (110B). For example, a query that accesses records in a single partition may scan a small portion of the data stored in the table.

The records (112A, 112N) may be distributed over the partitions (120A, 120N) of the database (108) based on partitioning information (114) for the table. In one or more embodiments, the database (108) includes table storage for different tables that are each partitioned using different partitioning information. The partitioning information (114) may include one or more fields (e.g., columns), referred to as partition fields. Distinct values of a partition field may be referred to as partition identifiers, where each distinct value identifies (e.g., corresponds to) a specific partition. For example, the partitioning information may include a single partition field "geographic region," where different partitions correspond to different geographic regions. Continuing this example, the partition identifiers for the partition field "geographic region" may be either India, US, or Canada. As another example, the partitioning information may include a single partition field "tenant," where the different partition identifiers are the different tenants of the database (108).

The parity service (106) may execute in a cloud as part of an ingestion platform. For example, the parity service (106) may execute as a job (e.g., a background job) in the Spark distributed processing system. The parity service (106) includes functionality to perform a parity comparison on a pair of records to generate a parity result (140). The parity service (106) includes functionality to send the parity result (140) to the computing system (102). The parity result (140) may be stored in the computing system (102) (e.g., in persistent storage (506) of the computing system (500) of FIG. 5A). For example, one record in the pair of records may be from table storage (110A) of the data lake (104) and the other record in the pair of records may be a corresponding record from table storage (110B) of the database (108). The parity comparison may determine whether the pair of records have matching (e.g., the same) parity. For example, a pair of records may have the same parity when each record in the pair includes an identical checksum. Continuing this example, when the pair of records include an identical checksum it may be assumed that the pair of records contain the same information and that no errors were introduced when storing (e.g., ingesting) a record from the database (108) into the data lake (104).

The parity result (140) may indicate pairs of records with non-matching parity. For example, the parity result (140) may include values of a subset of the fields of the pairs of records with non-matching parity. Continuing this example, the subset of the fields may include a primary key for the table. Further continuing this example, the primary key of the table may include a unique identifier for the corresponding record.

The computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The computing system (102) includes functionality to execute code (130) that generates a table identifier (132). The code (130) is a collection of statements (e.g., computer instructions) written in source code of a human-readable programming language. As an example, the code (130) may perform a static or dynamic security analysis of an application program. The computing system (102) includes functionality to send the table identifier (132) to the parity service (106).

The computing system (102) may include a user interface (UI) for receiving input from a user and transmitting output to the user. For example, the UI may be a graphical user interface or other user interface. The UI may be rendered and displayed within a local desktop software application or the UI may be generated by a remote web server and transmitted to a user's web browser executing locally on a desktop or mobile device.

While FIG. 1 shows a configuration of components, other configurations may be used without departing from the scope of the invention. For example, various components may be combined to create a single component. As another example, the functionality performed by a single component may be performed by two or more components.

Figure 2:
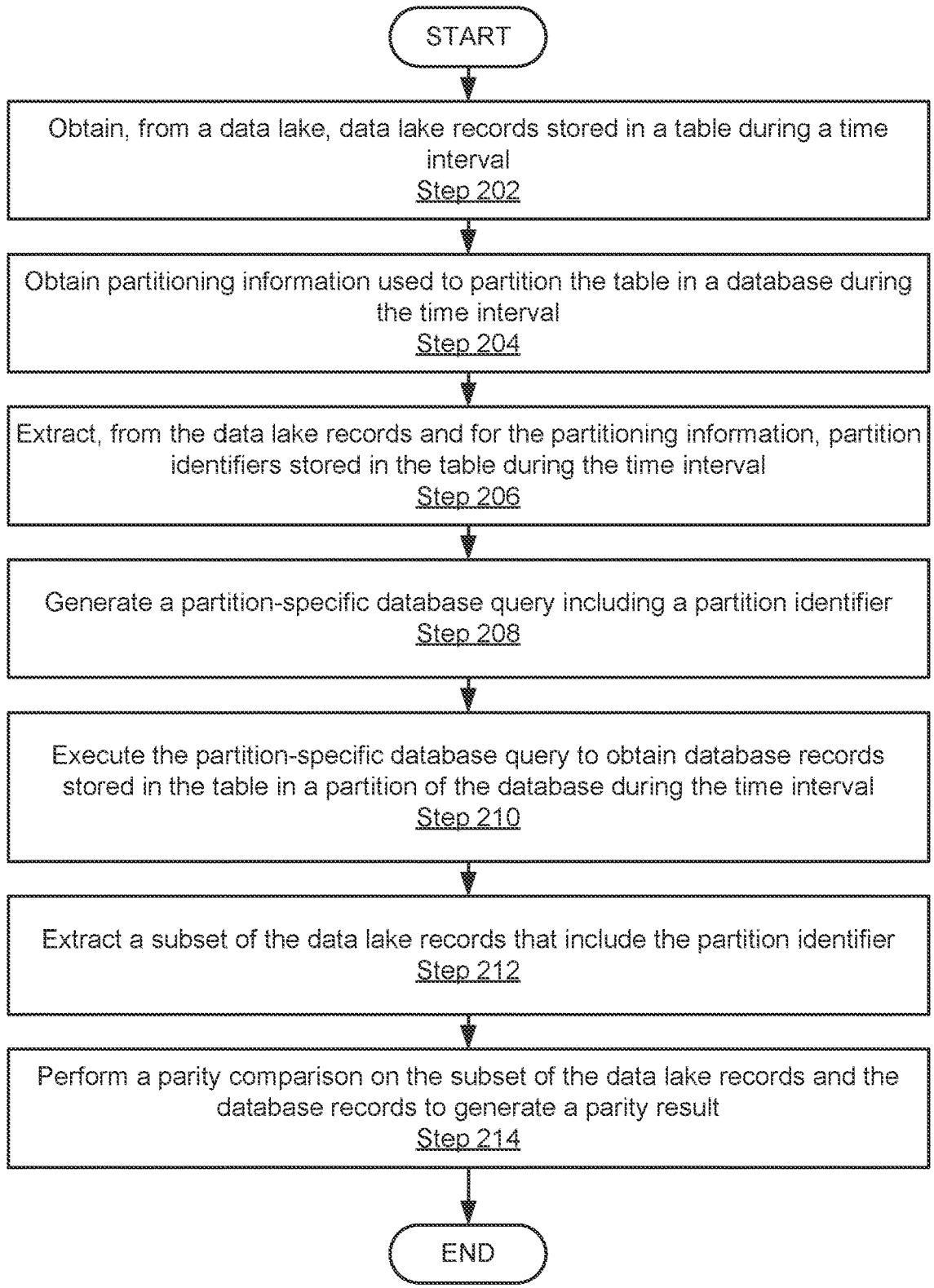
FIG. 2 and FIG. 3 show flowcharts in accordance with one or more embodiments of the invention.

FIG. 2 shows a flowchart in accordance with one or more embodiments of the invention. The flowchart depicts a process for ingesting (followed by performing a parity check on) a table by a software application. The table may be ingested to a data lake from a database. One or more of the steps in FIG. 2 may be performed by the components (e.g., the parity service (106) of the system (100)), discussed above in reference to FIG. 1. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, data lake records stored in the table during a time interval are obtained from a data lake. For example, the beginning of the time interval may be a point in time when the parity service last performed a parity comparison for the table, and the end of the time interval may be the point in time when records in the table were last stored in (e.g., ingested into) the table in the data lake. The records that arrived between during the time interval may be called change data capture (CDC) records. The parity service may obtain the data lake records by sending a query to the data lake that requests records in the table stored during the time interval. For example, the query may include a "where" clause that restricts the query results to be records that were stored in the table during the time interval. Continuing this example, the table may include a field (e.g., a "Last Modified" field) whose value is a timestamp corresponding to a point in time when each record is stored in the table.

In Step 204, partitioning information used to partition the table in a database during the time interval is obtained. The partitioning information may include one or more partition fields. The parity service may obtain the partitioning information by sending a query to the database that requests the partitioning information for the table. For example, the table may have a single partition field "Country" whose partition identifiers are either India, US, or Canada.

In Step 206, partition identifiers for the partitioning information stored in the table during the time interval are extracted from the data lake records. For example, the parity service may query the data lake records obtained in Step 202 above to extract partition identifiers for one or more partition fields in the partitioning information. Continuing the above example, the extracted partition identifiers for the partition field "Country" may be India, US, and Canada.

In Step 208, a partition-specific database query including a partition identifier is generated. The parity service may dynamically (e.g., at runtime) generate multiple partition-specific database queries each including a different partition identifier extracted in Step 206 above. For example, the database queries may be Java Database Connectivity (JDBC) queries.

In Step 210, the partition-specific database query is executed to obtain database records stored in the table in a partition of the database during the time interval. The result of each partition-specific query includes records stored in a specific partition of the database during the time interval. Thus, the database may scan a single partition when executing each partition-specific query. For example, each partition-specific query may include a "where" clause that restricts the query results to records that include a specific partition identifier for the partition field. The parity service may validate that each partition-specific database query refers to the partitioning information (e.g., a partition field) obtained in Step 204 above.

By executing partition-specific queries whose results are limited to a single partition of the database, the parity service may avoid sending queries to the database whose results include a very large number (e.g., millions) of records. For example, when query results include a very large number of records, one or more of the following adverse events may occur:

1) the database may allocate additional hardware and/or software resources to compute the query results;
2) the performance (e.g., response time) of the database may deteriorate; or
3) the database may fail to execute the query due to exhausting computational (e.g., memory) resources.

In Step 212, a subset of the data lake records that include the partition identifier is extracted from the data lake records. For example, the parity service may query the data lake records obtained in Step 202 above to extract the subset of data lake records that include the partition identifier.

In Step 214, a parity comparison is performed on the subset of data lake records and the database records to generate a parity result. The parity result may identify a mismatched subset of the database records in the partition whose parity fails to match a parity of a corresponding subset of the first data lake records. For example, the parity result may identify the database records in the mismatched subset with a primary key for each database record in the mismatched subset. The parity service may request that an ingestion service re-ingest the mismatched subset of the database records in the partition, in an attempt to correctly (e.g., while preserving parity) ingest the mismatched subset into the data lake.

The parity service may perform a parity comparison separately for each partition of the table. The parity service may combine the parity results for each partition into a combined parity result for the table.

The Steps of FIG. 2 may be repeated for subsequent time intervals. The partitioning information obtained in Step 204 may be different for a subsequent time interval. For example, a database administrator may reorganize the table storage using a new partition field. Continuing this example, the new partition field may be "Business Unit," instead of "Country." Thus, the partition identifiers extracted from the data lake records in Step 206 may be different for the subsequent time interval. Similarly, different partition identifiers may be used in the partition-specific database query generated in Step 208 for the subsequent time interval, etc.

Figure 3:
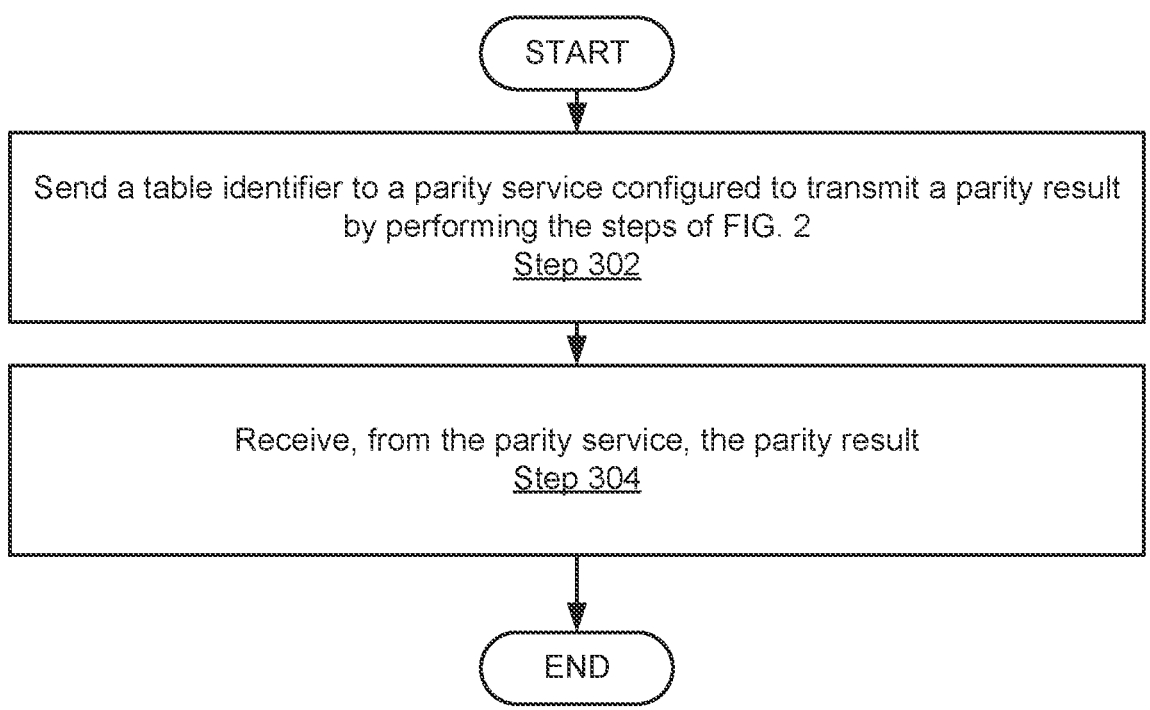

FIG. 3 shows a flowchart in accordance with one or more embodiments of the invention. The flowchart depicts a process for ingesting (followed by performing a parity check on) a table by a software application. One or more of the steps in FIG. 3 may be performed by the components (e.g., the parity service (106) and the computing system (102) of the system (100)) discussed above in reference to FIG. 1). In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

In Step 302, a table identifier is sent to a parity service configured to transmit a parity result by performing the steps of FIG. 2. The table identifier may be sent to the parity service via a network.

In Step 304, the parity result is received from the parity service. The parity result may be received from the parity service via the network.

Figure 4A:
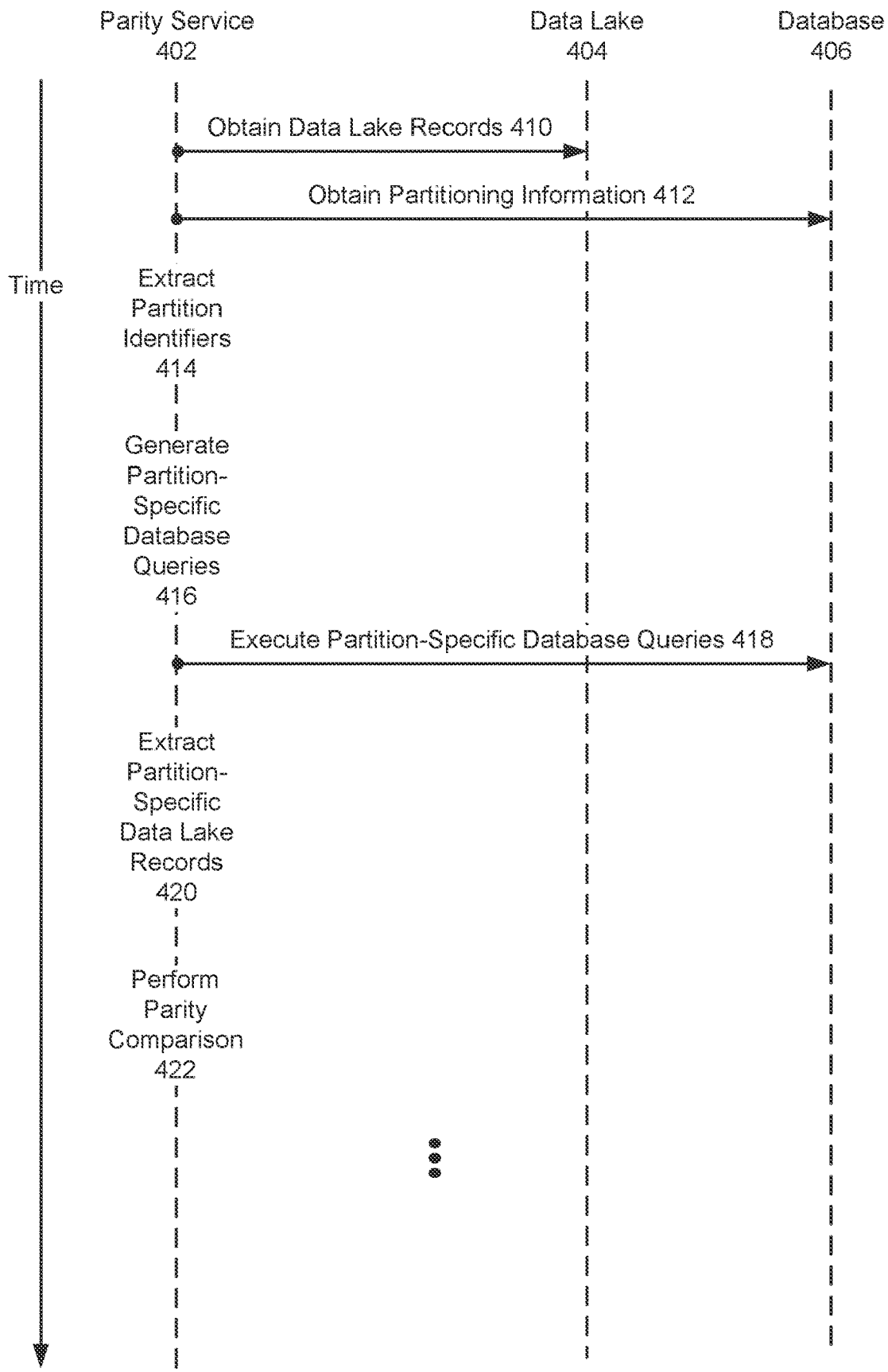
FIG. 4A and FIG. 4B show examples in accordance with one or more embodiments of the invention.
Figure 4B:
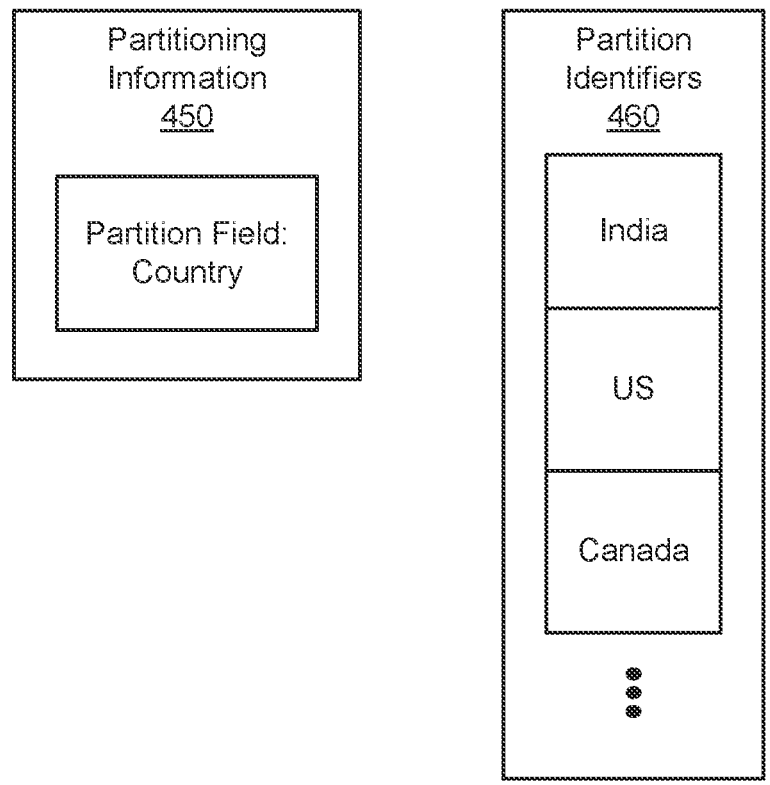
Figure 4B:
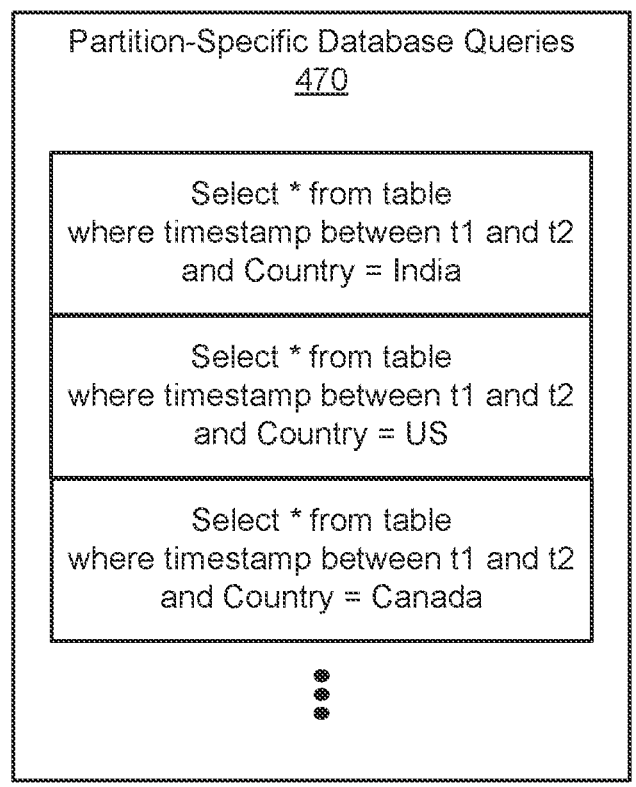

FIG. 4A and FIG. 4B show implementation examples in accordance with one or more embodiments. The implementation examples are for explanatory purposes only and not intended to limit the scope of the invention. One skilled in the art will appreciate that implementation of embodiments of the invention may take various forms and still be within the scope of the invention.

FIG. 4A shows the relative timing of steps performed by one or more components described in reference to FIG. 1, in accordance with the flowchart in FIG. 2. These components include: a parity service (402) ((106) in FIG. 1), a data lake (404) ((104) in FIG. 1), and a database (406) ((108) in FIG. 1).

As shown in FIG. 4A, initially, in Step 410, the parity service (402) obtains data lake records from the data lake (404). The data lake records are stored in a table during a time interval bounded by time t1 and time t2.

In Step 412, the parity service (402) obtains partitioning information from the database (406). The partitioning information is used to partition the table in the database (406) during the time interval. FIG. 4B shows that the partitioning information (450) ((114) in FIG. 1) includes the partition field Country.

In Step 414, the parity service (402) extracts partition identifiers for the partitioning information (450) stored in the table during the time interval from the data lake records. FIG. 4B shows that the partition identifiers (460) include India, US, and Canada.

In Step 416, the parity service (402) generates partition-specific database queries each including a different partition identifier extracted in Step 414 above. FIG. 4B shows the partition-specific database queries (470) corresponding to each of the partition identifiers (460) extracted in Step 414 above. FIG. 4B shows that each of the partition-specific database queries (470) includes a "where" clause that restricts the respective query results to records that include a specific partition identifier for the partition field Country.

In Step 418, the parity service (402) executes the partition-specific database queries by sending the partition-specific database queries (470) to the database (406). The result of each partition-specific query includes records stored in a specific partition of the database (406) during the time interval. The execution of each partition-specific query results in a scan of a single partition of the database (406).

In Step 420, the parity service (402) extracts partition-specific subsets of the data lake records that include the partition identifiers (460) included in the partition-specific database queries (470).

In Step 422, the parity service (402) performs a parity comparison to generate a parity result for the table. The parity result identifies mismatched subsets of database records in each partition whose parity fails to match a parity of a corresponding subset of the first data lake records. The parity service (402) combines the parity results for each partition into a combined parity result for the table.

Figure 5A:
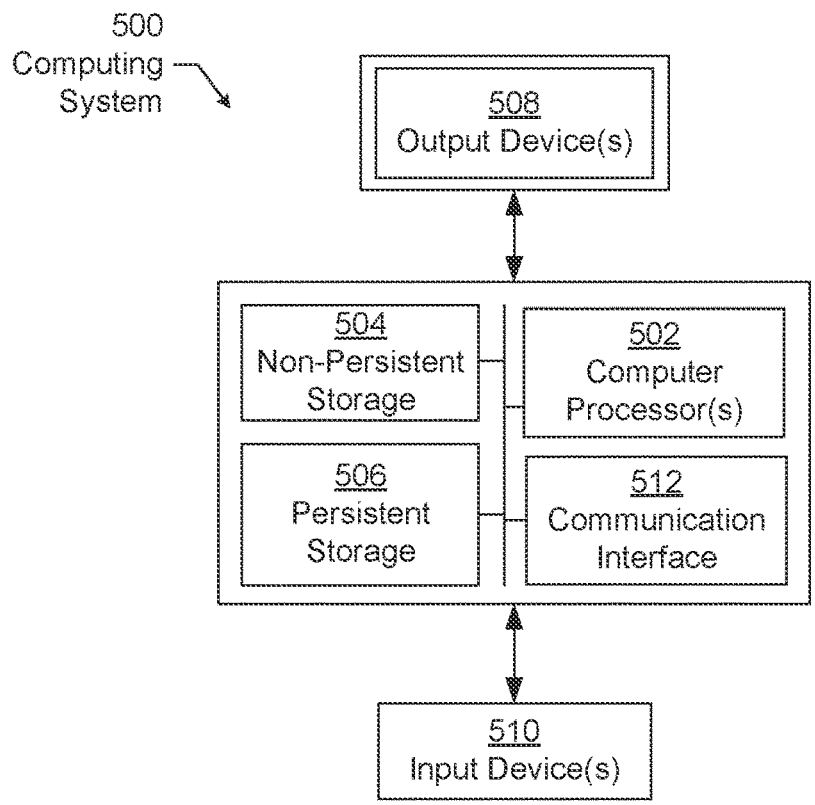
FIG. 5A and FIG. 5B show computing systems in accordance with one or more embodiments of the invention.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
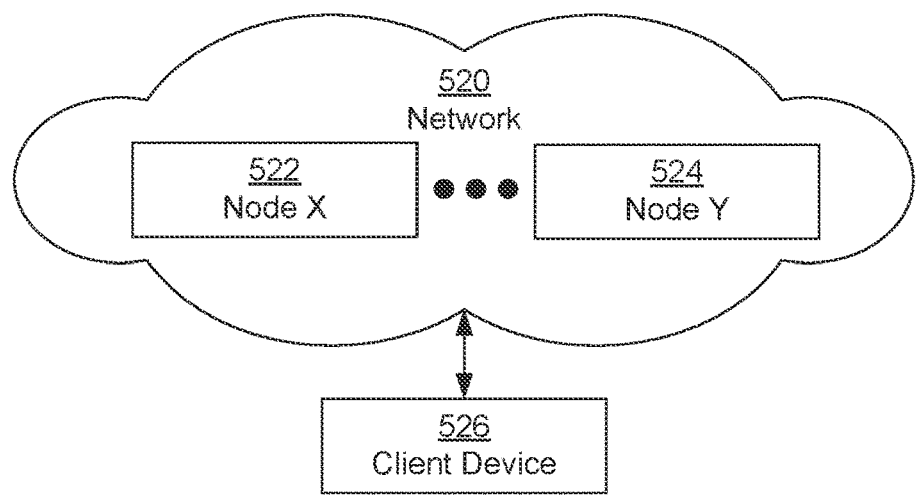

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a parity check of a table, comprising:
    ingesting the table from at least one partition of a database, wherein records of the table are stored in a plurality of partitions of the database, to a data lake;
    obtaining, from the data lake, initial data lake records stored in the table during an initial time interval;
    obtaining an initial partitioning information including at least one partitioning field, the at least one partitioning field having at least one partition identifier,
        wherein the at least one partition identifier is a distinct partition value of the at least one partitioning field, for partitioning the table in the database during the initial time interval;
    extracting, from the initial data lake records of the table of the data lake, an initial plurality of partition identifiers stored in the table during the initial time interval, wherein each partition identifier of the initial plurality of partition identifiers identifies a partition in the database storing the records of the table;
    generating a first partition-specific database query comprising a first partition identifier of the initial plurality of partition identifiers;
    executing the first partition-specific database query to obtain first database records stored in the table in a first partition of the database during the initial time interval;
    extracting a first partition-specific subset of the initial data lake records that include the first partition identifier;
    performing a first parity comparison on corresponding checksums of records of the first partition-specific subset of the initial data lake records and records of the first database records to generate a first parity result identifying the records of the first database records having a checksum mismatch with the records of the first partition-specific subset of the initial data lake records;
    generating a second partition-specific database query comprising a second partition identifier of the initial plurality of partition identifiers;
    executing the second partition-specific database query to obtain second database records stored in the table in a second partition of the database during the initial time interval;
    extracting a second partition-specific subset of the initial data lake records that include the second partition identifier;
    performing a second parity comparison on corresponding checksums of records of the second partition-specific subset of the initial data lake records and records of the second database records to generate a second parity result identifying the records of the second database records having a checksum mismatch with the records of the second partition-specific subset of the initial data lake records; and
    combining the first parity result and the second parity result to generate a combined parity result,
    wherein the combined parity result identifies (i) a subset of the first database records stored in the first partition that fail to match a parity of the first partition-specific subset of the initial data lake records, and (ii) a subset of the second database records stored in the second partition that fail to match a parity of the second partition-specific subset of the initial data lake records.

2. The method of claim 1, further comprising:
    validating that the first partition-specific database query and the second partition-specific database query refer to the initial partitioning information.

3. The method of claim 1, wherein the first partition identifier corresponds to a first tenant of the database, and wherein the second partition identifier corresponds to a second tenant of the database.

4. The method of claim 1, further comprising:
    obtaining, from the data lake, next data lake records stored in the table during a next time interval;
    obtaining a succeeding partitioning information for partitioning the table in the database during the next time interval;
    extracting, from the next data lake records, and for the succeeding partitioning information, a next plurality of partition identifiers stored in the table during the next time interval;
    generating a third partition-specific database query comprising a third partition identifier of the next plurality of partition identifiers;
    executing the third partition-specific database query to obtain third database records stored in the table in a third partition of the database during the next time interval;
    extracting a third partition-specific subset of the next data lake records that comprise the third partition identifier; and
    performing a third parity comparison on corresponding checksums of records of the third partition-specific subset of the next data lake records and records of the third database records to generate a third parity result identifying the records of the third database records having a checksum mismatch with the records of the third partition-specific subset of the next data lake records.

5. The method of claim 1,
    wherein the table in the database is partitioned during the initial time interval based on the initial partitioning information.

6. The method of claim 5, wherein
    the initial plurality of partition identifiers are stored in the table during the initial time interval, and wherein the initial partitioning information comprises a field tenant where different partition identifiers are different tenants of the database.

7. A system for performing a parity check of a table, comprising:
    at least one computer processor;
    a memory operatively coupled to the at least one computer processor;
    at least one physical storage device;
    a database stored in the at least one physical storage device, configured to store the table in a plurality of partitions corresponding to an initial plurality of partition identifiers based on an initial partitioning information for an initial time interval;
    a data lake stored in the at least one physical storage device, configured to store an initial data lake records in the table during the initial time interval, wherein the table is ingested from at least one partition of the database; and a parity service executing on the at least one computer processor, configured for:
obtaining, from the data lake, the initial data lake records,
obtaining the initial partitioning information including at least one partitioning field, the at least one partitioning field having at least one partition identifier, wherein the at least one partition identifier is a distinct partition value of the at least one partitioning field,
extracting, from the initial data lake records of the table of the data lake, the initial plurality of partition identifiers, wherein each partition identifier of the initial plurality of partition identifiers identifies a partition of the plurality of partitions in the database storing of the table;
generating a first partition-specific database query comprising a first partition identifier of the initial plurality of partition identifiers;
executing the first partition-specific database query to obtain first database records stored in the table in a first partition of the database during the initial time interval;
extracting a first partition-specific subset of the initial data lake records that comprise the first partition identifier;
performing a first parity comparison on corresponding checksums of records of the first partition-specific subset of the initial data lake records and records of the first database records to generate a first parity result identifying the records of the first database records having a checksum mismatch with the records of the first partition-specific subset of the initial data lake records;
generating a second partition-specific database query comprising a second partition identifier of the initial plurality of partition identifiers;
executing the second partition-specific database query to obtain second database records stored in the table in a second partition of the database during the initial time interval;
extracting a second partition-specific subset of the initial data lake records that include the second partition identifier;
performing a second parity comparison on corresponding checksums of records of the second partition-specific subset of the initial data lake records and records of the second database records to generate a second parity result identifying the records of the second database records having a checksum mismatch with the records of the second partition-specific subset of the initial data lake records; and
combining the first parity result and the second parity result to generate a combined parity result,
wherein the combined parity result identifies (i) a subset of the first database records stored in the first partition that fail to match a parity of the first partition-specific subset of the initial data lake records, and (ii) a subset of the second database records stored in the second partition that fail to match a parity of the second partition-specific subset of the initial data lake records.

8. The system of claim 7, wherein the parity service is further configured for:

validating that the first partition-specific database query and the second partition-specific database query refer to the initial partitioning information.

9. The system of claim 7, wherein the parity service is further configured for:
obtaining, from the data lake, next data lake records stored in the table during a next time interval;
obtaining a succeeding partitioning information for partitioning the table in the database during the next time interval;
extracting, from the next data lake records for the succeeding partitioning information, a next plurality of partition identifiers stored in the table during the next time interval;
generating a third partition-specific database query comprising a third partition identifier of the next plurality of partition identifiers;
executing the third partition-specific database query to obtain third database records stored in the table in a third partition of the database during the next time interval;
extracting a third partition-specific subset of the next data lake records that comprise the third partition identifier; and
performing a third parity comparison on corresponding checksums of records of the third partition-specific subset of the next data lake records and records of the third database records to generate a third parity result identifying the records of the third database records having a checksum mismatch with the records of the third partition-specific subset of the next data lake records.

10. The system of claim 7, wherein the table in the database is partitioned during the initial time interval based on the initial partitioning information.

11. The system of claim 10,
wherein the initial plurality of partition identifiers are stored in the table during the initial time interval, and
wherein the initial partitioning information comprises a field tenant where different partition identifiers are different tenants of the database.

12. A method for performing a parity check of a table, comprising:
sending a table identifier to a parity service configured to perform:
obtaining, from a data lake, initial data lake records stored in the table corresponding to the table identifier during an initial time interval, wherein the table is ingested from at least one partition of a database, wherein records of the table are stored in a plurality of partitions of the database,
obtaining an initial partitioning information including at least one partitioning field, the at least one partitioning field having at least one partition identifier, wherein the at least one partition identifier is a distinct partition value of the at least one partitioning field,
for partitioning the table in the database during the initial time interval,
extracting, from the initial data lake records and for the initial partitioning information, an initial plurality of partition identifiers stored in the table during the initial time interval, wherein each partition identifier of the initial plurality of partition identifiers identifies a partition in the database storing the records of the table, generating a first partition-specific database query comprising a first partition identifier of the initial plurality of partition identifiers, executing the first partition-specific database query to obtain first database records stored in the table in a first partition of the database during the initial time interval, extracting a first partition-specific subset of the initial data lake records that comprise the first partition identifier, performing a first parity comparison on corresponding checksums of records of the first partition-specific subset of the initial data lake records and records of the first database records to generate a first parity result identifying the records of the first database records having a checksum mismatch with the records of the first partition-specific subset of the initial data lake records, generating a second partition-specific database query comprising a second partition identifier of the initial plurality of partition identifiers, executing the second partition-specific database query to obtain second database records stored in the table in a second partition of the database during the initial time interval, extracting a second partition-specific subset of the initial data lake records that include the second partition identifier, performing a second parity comparison on corresponding checksums of records of the second partition-specific subset of the initial data lake records and records of the second database records to generate a second parity result identifying the records of the second database records having a checksum mismatch with the records of the second partition-specific subset of the initial data lake records, and combining the first parity result and the second parity result to generate a combined parity result, wherein the combined parity result identifies (i) a subset of the first database records stored in the first partition that fail to match a parity of the first partition-specific subset of the initial data lake records, and (ii) a subset of the second database records stored in the second partition that fail to match a parity of the second partition-specific subset of the initial data lake records, transmitting the first parity result; and receiving, from the parity service, the first parity result.

13. The method of claim 12, wherein the parity service is further configured to perform:

obtaining, from the data lake, next data lake records stored in the table during a next time interval;

obtaining a succeeding partitioning information for partitioning the table in the database during the next time interval;

extracting, from the next data lake records, and for the succeeding partitioning information, a next plurality of partition identifiers stored in the table during the next time interval;

generating a third partition-specific database query comprising a third partition identifier of the next plurality of partition identifiers;

executing the third partition-specific database query to obtain third database records stored in the table in a third partition of the database during the next time interval;

extracting a third partition-specific subset of the next data lake records that comprise the third partition identifier; and performing a third parity comparison on corresponding checksums of records of the third partition-specific subset of the next data lake records and records of the third database records to generate a third parity result identifying the records of the third database records having a checksum mismatch with the records of the third partition-specific subset of the next data lake records.

14. The method of claim 12, wherein the table in the database is partitioned during the initial time interval based on the initial partitioning information.

15. The method of claim 14, wherein the initial plurality of partition identifiers are stored in the table during the initial time interval, and wherein the initial partitioning information comprises a field tenant where different partition identifiers are different tenants of the database.

* * * * *